United States Patent
Keller et al.

(10) Patent No.: US 9,851,030 B2
(45) Date of Patent: Dec. 26, 2017

(54) CONNECTING APPARATUS FOR CREATING A CONNECTION BETWEEN A MEASURING INSTRUMENT/VALVE BLOCK AND A PIPELINE

(71) Applicant: Armaturenfabrik Franz Schneider GmbH + Co. KG, Nordheim (DE)

(72) Inventors: Stefan Keller, Sternenfels (DE); Markus Häffner, Pfaffenhofen (DE)

(73) Assignee: ARMATURENFABRIK FRANZ SCHNEIDER GMBH + CO. KG, Nordheim (DE)

( * ) Notice: Subject to any disclaimer, the term of this patent is extended or adjusted under 35 U.S.C. 154(b) by 321 days.

(21) Appl. No.: 14/694,205

(22) Filed: Apr. 23, 2015

(65) Prior Publication Data

US 2015/0308592 A1    Oct. 29, 2015

(30) Foreign Application Priority Data

Apr. 23, 2014   (DE) .................. 10 2014 005 783

(51) Int. Cl.
  *F16L 39/00*  (2006.01)
  *F16L 19/02*  (2006.01)
  (Continued)

(52) U.S. Cl.
  CPC .......... *F16L 19/0231* (2013.01); *F16K 3/246* (2013.01); *F16K 27/02* (2013.01); *F16L 15/00* (2013.01); *F16L 19/025* (2013.01); *F16L 41/008* (2013.01); *G01F 1/00* (2013.01); *G01F 1/40* (2013.01); *G01F 1/42* (2013.01); *F16L 23/003* (2013.01); *F16L 41/10* (2013.01)

(58) Field of Classification Search
  CPC .................................................. F16L 19/0231

USPC ....... 285/120.1, 122.1, 125.1, 133.11, 133.4, 285/386; 251/326

See application file for complete search history.

(56) References Cited

U.S. PATENT DOCUMENTS

| 2,270,371 A | 1/1942 | Frazier |
| 2,272,861 A | 2/1942 | Yohpe |

(Continued)

FOREIGN PATENT DOCUMENTS

DE    20120042 U    4/2003

OTHER PUBLICATIONS

Office Action (Search Report) dated Jan. 30, 2015 for the corresponding German Application No. 102014005783.6.

*Primary Examiner* — Aaron Dunwoody
(74) *Attorney, Agent, or Firm* — Leason Ellis LLP (57) ABSTRACT

A connecting apparatus for creating a connection to a measuring instrument or to a valve block/valve with a measuring instrument, and a connection to a pipeline or to a metering orifice device installed in a pipeline comprises: a first connecting device that provides a sealing connection to the pipeline or to the metering orifice device with a first recess extending through in the longitudinal direction, and a second connecting device that provides a sealing connection to the measuring instrument or to the valve block/valve with a second recess extending through in the longitudinal direction. The first and second connecting devices are interconnected with sealing effect. The connecting unit is designed so that the sealing connection can be created solely by rotation of the connecting unit without rotating the first and second connecting devices.

7 Claims, 7 Drawing Sheets

(51) Int. Cl.
  *F16L 15/00* (2006.01)
  *F16L 19/025* (2006.01)
  *F16L 41/00* (2006.01)
  *G01F 1/00* (2006.01)
  *G01F 1/40* (2006.01)
  *G01F 1/42* (2006.01)
  *F16K 3/24* (2006.01)
  *F16K 27/02* (2006.01)
  *F16L 41/10* (2006.01)
  *F16L 23/00* (2006.01)

(56) References Cited

U.S. PATENT DOCUMENTS

| | | |
|---|---|---|
| 3,041,880 A | 7/1962 | McCarvell et al. |
| 3,337,181 A | 8/1967 | Wennerstrom |
| 3,430,917 A | 3/1969 | Pellett |
| 4,778,204 A * | 10/1988 | Berger .................... F16L 47/04 285/353 |
| 4,898,705 A * | 2/1990 | Kyomen ................ B23P 11/02 264/242 |
| 4,920,626 A | 5/1990 | Nimberger |
| 4,974,308 A | 12/1990 | Nimberger |
| 5,000,031 A | 3/1991 | Potvin |
| 5,152,499 A * | 10/1992 | Silverman ........... F16L 19/0231 251/148 |
| 6,302,446 B1 * | 10/2001 | Spears ................ F16L 19/0231 285/33 |
| D615,617 S | 5/2010 | Hutton |
| 2001/0037829 A1 | 11/2001 | Shaw et al. |
| 2009/0211053 A1 | 8/2009 | George et al. |
| 2013/0118623 A1 | 5/2013 | Nguyen |

* cited by examiner

CONNECTING APPARATUS FOR CREATING A CONNECTION BETWEEN A MEASURING INSTRUMENT/VALVE BLOCK AND A PIPELINE

This application claims the benefit of German Patent Application No. 102014005783.6, filed Apr. 23, 2014, which is incorporated by reference in its entity herein.

FIELD OF THE INVENTION

The present invention relates to a connecting apparatus for creating a connection to a measuring instrument or to a valve block/valve with a measuring instrument, and a connection to a pipeline or to a metering orifice device installed in a pipeline, having a first connecting device for the direct or indirect sealing connection to the pipeline or to the metering orifice device with a first recess extending through in the longitudinal direction, and having a second connecting device for the direct or indirect sealing connection to the measuring instrument or to the valve block/valve with a second recess extending through in the longitudinal direction, wherein the first and second connecting devices are interconnected with sealing effect.

BACKGROUND OF THE INVENTION

In pipelines, especially gas pipelines, it is necessary to check the flow rate during continuous operation. To this end, use is made of measuring instruments which operate according to the differential pressure method. In this case, a metering orifice device is installed in the pipeline and the pressure inside the pipeline is measured upstream of the orifice of the metering orifice device and downstream of the orifice of the metering orifice device and the flow rate calculated from the difference. The measuring instrument is usually connected in this case to a 3-way or 5-way valve block. A connecting apparatus is installed in each case between the metering orifice device and the valve block so that the measuring instrument is in communication via the connecting apparatus with the interior of the pipeline upstream and downstream of the metering orifice device in each case and the pressure ratios can be measured.

Using such connecting apparatuses enables a direct installation of the valve block or of the measuring instrument on the metering orifice device. In comparison to remote, piped installation, with direct installation there is the advantage that measurement errors are significantly reduced and the measuring system becomes more reliable. Such connecting apparatuses have to ensure a permanently reliable sealing function during heavy duty at different temperatures and also in the event of severe vibrations occurring inside the fluid system.

A connecting apparatus, which is designed in one piece, is known from U.S. Pat. No. 4,974,308 and U.S. Pat. No. 4,920,626. In the end region facing the metering orifice device provision is made for a conical thread which is screwed into a corresponding thread of the metering orifice device until a sealing effect is provided. In the opposite end region, the connecting apparatus has a connecting flange which via a threaded connection is connected by a valve block to the measuring instrument.

Also known are connecting apparatuses which additionally have an integrated shutoff valve. In this case, however, the following problems ensue: Since the measuring instrument operates according to the principle of differential pressure measurement there is always a requirement for two connecting apparatuses which are to be arranged at a relative small distance from each other since the metering orifice device, to which are connected the connecting apparatuses, have to be of a relatively compact design in order to deliver reliable values. The shutoff valve is normally arranged perpendicularly to the longitudinal direction of the connecting apparatus and is constructionally higher than the distance between the two connecting apparatuses. As a result, with the first connecting apparatus installed the second connecting apparatus can no longer be screwed into the metering orifice device by rotation since the projecting shutoff valve collides with the first connecting apparatus when being screwed in.

There are also solutions in one piece in which the valve top part is supplied loose and after installation of the connecting apparatuses on the metering orifice device the client then has to install said top part. As a result, the following disadvantages ensue: The valve has to be installed at the work site so that a leak test or strength test by the valve manufacturer cannot be carried out and therefore no guarantee for leak tightness can be accepted either. If now during practical operation leaks occur, conflicts frequently occur between manufacturer and user since the leak can be caused by a faulty valve or a by faulty installation.

A valve apparatus according to the features of the preamble of claim 1 is known from U.S. Pat. No. 7,938,453 B2. The first connecting device is screwed into the metering orifice device via a conical thread. The second connecting device, which on the upper side has a connecting flange for the valve block, is screwed into the first connecting device, wherein the first connecting device has a corresponding blind hole opening with female thread and the second connecting device has a male thread.

This solution, however, requires an adjustment of the first and second connecting devices in relation to each other so that the connecting flange on the measuring instrument side can be brought into position.

An optimally integrated shutoff valve could also be installed at site only after installing the connecting apparatus.

In the case of two-part embodiments, in which the two connecting devices are connected by means of a flange, the shutoff valve can admittedly already be installed beforehand but there is the disadvantage that the connecting device, which has to be screwed into the metering orifice device, has to be already installed in position so that the connection to the valve block can be made.

SUMMARY OF THE INVENTION

Starting from the referenced prior art, the present invention is based on the technical problem or the object of disclosing a connecting apparatus of the type referred to in the introduction which can be economically produced, enables a simple and fast installation, especially in the case of connecting apparatuses with an associated shutoff valve, and ensures a permanently reliable function.

The connecting apparatus according to the invention of the type referred to in the introduction is distinguished accordingly by the fact that provision is made for a connecting unit, which is connected to the first and second connecting device, for the sealing connection of said first and second connecting devices and is designed so that the sealing connection can be created solely by rotation of the connecting unit without rotation of the first and second connecting devices.

The installation apparatus according to the invention eliminates the previous problems during installation since with this solution the following installation is made possible: The first connecting device, by the conical thread, is screwed into the metering orifice device or the like, specifically just as much as is necessary in order to ensure the necessary leak tightness. The fitter has no need to worry about the position of the connecting device with regard to the connection of the remaining components. The second connecting device can then be screwed down by means of the connecting unit, wherein this is possible in any chosen rotational position of the second connecting device. It is even possible that the fitter, before he activates the connecting unit or forcibly screws it down, has already installed the valve block on the second connecting device and in the process has aligned the flanges of the connecting devices with the connecting interface of the valve block, and only then screws down tight the connecting unit.

A constructionally, particularly simple and preferred embodiment is distinguished by the fact that the upper edge region of the first connecting device which faces away from the pipeline has an outwardly pointing connecting flange and an end-face sealing surface, the lower edge region of the second connecting device facing the pipeline has a male thread and an end-face sealing surface, and the connecting unit is designed as a nut unit with a female thread and an inwardly pointing inner flange arranged in the lower edge region facing the pipeline, wherein the outer flange of the first connecting unit fits behind the inner flange of the nut unit and the female thread of the nut unit is screwed onto the male thread of the second connecting device so that by means of the inner flange and the outer flange the end-face sealing surfaces are clamped to each other with sealing effect.

This embodiment ensures a particularly simple installation. The first connecting device is introduced into the nut unit in this case until the connecting flange comes to butt against the inner flange. After the screwing of the first connecting device into the metering orifice device, and after attaching the second connecting device, this can then be clamped in a simple manner by rotating the nut unit together with the first connecting device without the second connecting device having to execute a rotation. At the same time, the second connecting device can be positioned so that the flange corresponds to the connecting interface of the valve block or of the measuring instrument.

An especially preferred embodiment is distinguished by the fact that a shutoff valve, the longitudinal axis of which extends obliquely to the longitudinal axis of the apparatus, especially at an angle of 90°, is connected to the second connecting device. By an additional shutoff valve being provided on the connecting apparatus, the valve block unit or the measuring instrument can, for example, if required, be exchanged without any problem in the case of a defect.

A constructionally particularly simple preferred embodiment is distinguished by the fact that the outer flange and the inner flange are provided in an encompassing manner on the first connecting device or the nut unit, wherein according to an advantageous development sealing means are arranged between the upper end side/end face of the outer flange of the first connecting device and the lower end side/end face of the second connecting device.

These sealing means can designed in a wide variety of forms. For example, provision can be made for O-rings consisting of sealing plastic such as PTFE, elastomer or graphite, which for example are arranged inside a groove. A coating of the end faces with sealing material also come into consideration. An especially good sealing function with high press-on pressure can also be ensured by, for example, the end face of the first connecting device having a face-turned surface and by the end face of the second connecting device having a turned projecting nose unit.

An advantageous embodiment, which ensures a reliable, sealed connection to the metering orifice device, is distinguished by the fact that the first connecting device has a thread, especially a conical thread, in its lower edge region facing the pipeline. In this case, the thread is preferably formed as an NPT connecting thread according to US standard ASME B1.20.1.

In order to ensure a stable connection of the connecting apparatus to the metering orifice device or to the pipeline, an advantageous embodiment is distinguished by the fact that the first connecting device has a male thread onto which can be screwed a clamping nut with female thread, wherein the clamping nut can be clamped directly or indirectly on the surface. This variant is advantageous if a flat connecting surface is present. An alternative embodiment, which ensures a high connecting stability even in the case of curved surfaces, is distinguished by the fact that beneath the clamping nut provision is made for a baseplate with through-openings through which the first connecting device can pass, in certain sections, in the longitudinal direction, which baseplate can be clamped on the surface of the pipeline by means of the clamping nut.

A simple connection of the second connecting device to the valve block or to the measuring instrument is distinguished according to a preferred embodiment by the fact that the second connecting device in its upper edge region facing away from the pipeline has an outwardly pointing connecting flange for connecting to a valve block or to a measuring instrument.

Further embodiments and advantages of the invention are provided by the features which are additionally cited in the claims and also by the exemplary embodiment specified below. The features of the claims can be combined with each other in any way providing they are not obviously mutually exclusive.

BRIEF DESCRIPTION OF THE DRAWING

The invention and also advantageous embodiments and developments of such are described and explained in more detail in the following text based on the examples represented in the drawings. The features which are to be gathered from the description and from the drawings can be applied according to the invention individually or in groups in any combination. In the drawings.

DETAILED DESCRIPTION OF THE INVENTION

Figure 6:
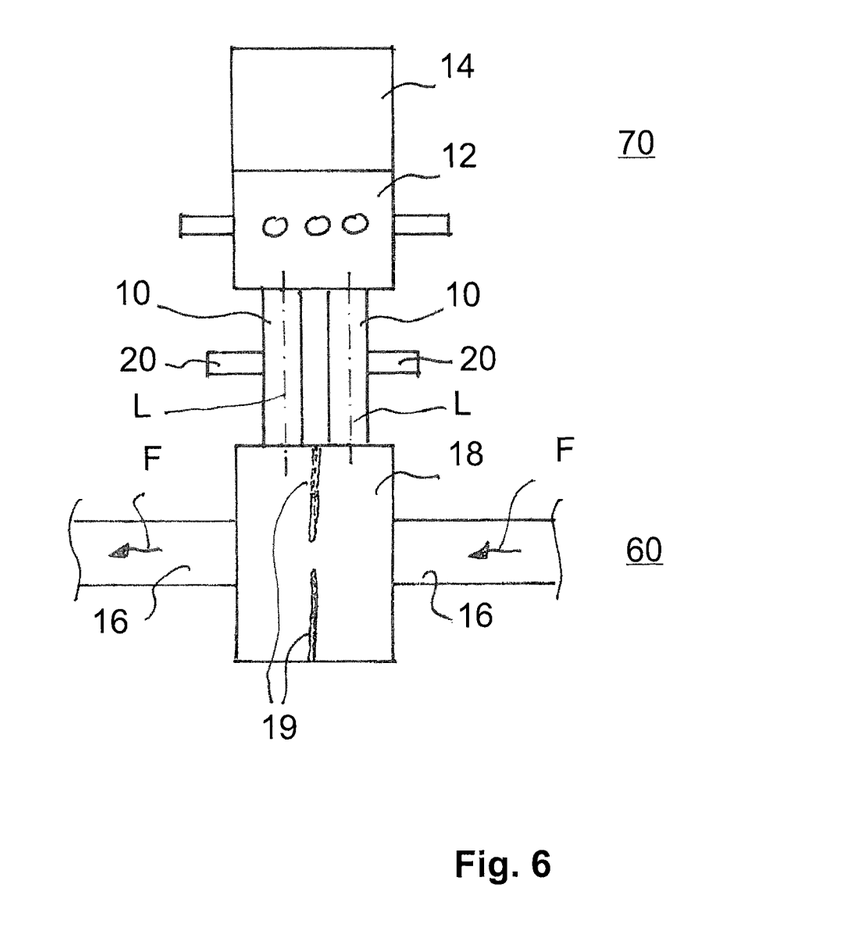
FIG. 6 shows a schematic side view of a measuring instrument, which is connected to a 5-way valve block, and a metering orifice device which is arranged inside a pipeline, wherein two connecting apparatuses, spaced apart in parallel in the longitudinal direction, according to FIG. 1 with an outwardly pointing shutoff valve in each case, are installed between the valve block and the metering orifice device, shown in a greatly schematized representation.

Shown greatly schematized in FIG. 6 is the field of application of a connecting apparatus 10 according to the invention. In the figures, the lower side is basically provided with the designation 60 and the upper side is basically provided with the designation 70 so that the terms "upper side" and "lower side" used in the further embodiments are clearly defined.

Provision is made in the lower side for a pipeline 16, which can be a natural gas pipeline, for example, through which flows natural gas in the fluid flow direction F. Installed in the pipeline 16 is a metering orifice device 18 with an orifice unit 19 provided on the inside so that in the region of this metering orifice device 18 there is a cross-sectional constriction for the through-flowing fluid so that different pressure ratios result directly upstream of the orifice unit 19 and directly downstream of the orifice unit 19 and are evaluated for determining the flow rate. The evaluation is carried out via a measuring instrument 14 arranged on the upper side, which in the represented exemplary embodiment is mounted on a 5-way valve block 12. The connection between the valve block 12, and therefore the measuring instrument 14, and the metering orifice device 18 is created by means of two connecting apparatuses 10 according to the invention which in each case are in communication with the inside of the fluid cross section directly upstream and directly downstream of the orifice unit 19 of the metering orifice device 18 so that the measuring instrument 14 can measure the pressures which are present and can calculate the flow rate of the fluid based on the difference. The measuring instrument 14 indicates either the determined differential pressure/the determined flow rate and/or transmits this to a control station, which is not shown in more detail in FIG. 6. The longitudinal direction of the connecting apparatus 10 is provided with the designation L in FIG. 6 and in the remaining figures.

In addition, a shutoff valve 20 is connected to each connecting apparatus 10, which shutoff valve projects outward by its geometry in each case and by means of which the connection between pipeline 16 and measuring instrument 14 can be opened or closed via the connecting apparatus 10. The provision of shutoff valves 20 is especially advantageous to the effect that exchanging the valve block or the measuring instrument is possible in a simple manner without the fluid flow having to be interrupted. In addition, the shutoff valve 20 constitutes additional safety in conjunction with the valves of the valve block 12.

In the following text, with reference to FIGS. 1 to 5, a constructional exemplary embodiment of an inventive apparatus 10 according to the invention is described.

Figure 2:
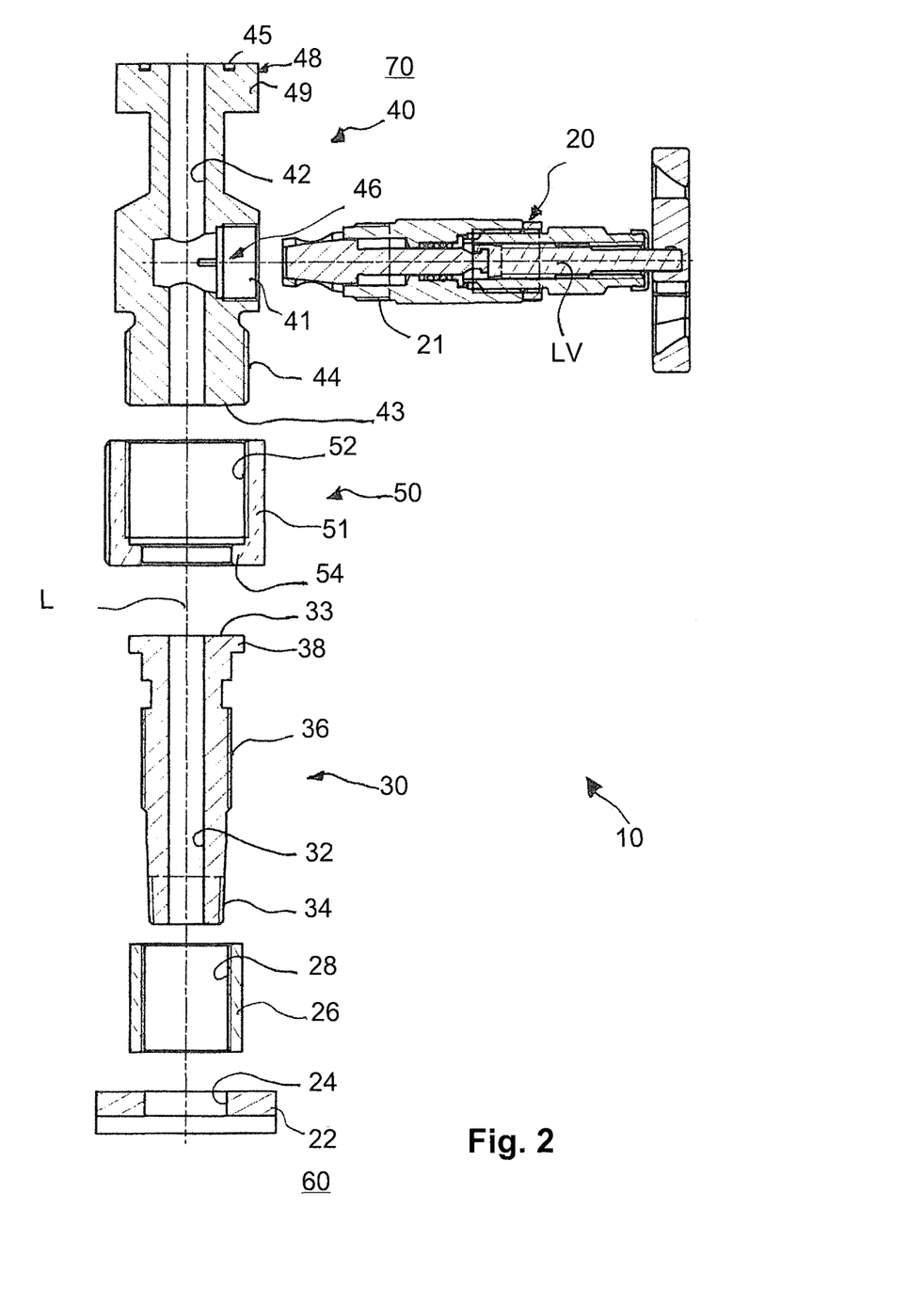
FIG. 2 shows a schematic cross-sectional view of the connecting apparatus according to FIG. 1 in exploded view.

The individual components of the exemplary embodiment of the connecting apparatus 10 according to the invention are particularly clearly evident with their details from the exploded sectional view according to FIG. 2. The connecting apparatus 10 according to the invention has a first connecting device 30 and a second connecting device 40, wherein the two connecting devices 30, 40 via a connecting unit 50 are interconnected with sealing effect by, for example, the connecting unit 50 clamping an end-face sealing surface 43 of the second connecting device 40 to an end-face sealing surface 33 of the first connecting device 30 with sealing effect. The first connecting device 30 is suitable for being connected to the metering orifice device 18 (see FIG. 6) and the second connecting device 40 is suitable for being connected to the valve block 12 (see FIG. 6).

The first connecting device 30 has a conical thread 34 on the lower side. A male thread 36 is formed in the middle outer wall region of the first connecting device 30. In the upper end region, the first connecting device 30 has an outwardly pointing, encompassing connecting flange 38.

Beneath the first connecting device 30, a clamping nut 26 with a female thread 28 is shown in FIG. 2, wherein the inside diameter of the clamping nut 26 is designed so that this can be screwed onto the male thread 36 of the first connecting device 30.

Beneath the clamping nut 26, a baseplate 22, which has a through-opening 24, is shown in FIG. 2. The baseplate through-opening 24 is selected to be of such size in this case that the baseplate 22 can be pushed from the bottom onto the first connecting device 30 up to the lower end of the male thread 36.

The first connecting device 30 furthermore has a first through-opening 32 in the longitudinal direction L.

The second connecting device 40 similarly has a second through-opening 42 in the longitudinal direction L. In its lower edge region, provision is made for a male thread 44. Formed in the approximately middle region of the second connecting device 40 is a connecting unit 46 which is suitable for connecting a shutoff valve 20 with sealing effect, the longitudinal axis LV of which extends in the main at right angles to the longitudinal axis L and by means of which the through-opening 42 of the second connecting device 40 can be selectively opened or closed. The connection of the shutoff valve 20 to the second connecting device 40 is carried out in the exemplary embodiment via a female thread 41 of the connecting unit 46, into which is screwed a male thread 21 of the shutoff valve 20.

In its upper end region, the second connecting device 40 has an upper connecting unit 48 which is designed as an outwardly projecting double-sided connecting flange 49. The upper connecting unit 48 has a threaded opening 47 oppositely disposed on each outer side (see FIG. 5). By means of each threaded opening 47, the valve block can be flanged on via screw units. Moreover, a groove 45, inside which are arranged sealing means—not shown in more detail—is formed in the upper end side of the connecting unit 48.

The upper connecting unit 48 serves for creating a sealing connection to the valve block 12 (see FIG. 6).

In its lower end-face region, the second connecting device 40 has a sealing surface 43.

The connecting unit 50 is designed as a nut unit 51 with a female thread 52 and an inwardly pointing inner flange 54 provided in the lower edge region. The inner flange 54 has an end-face sealing surface 33 on the upper side.

Figure 1:
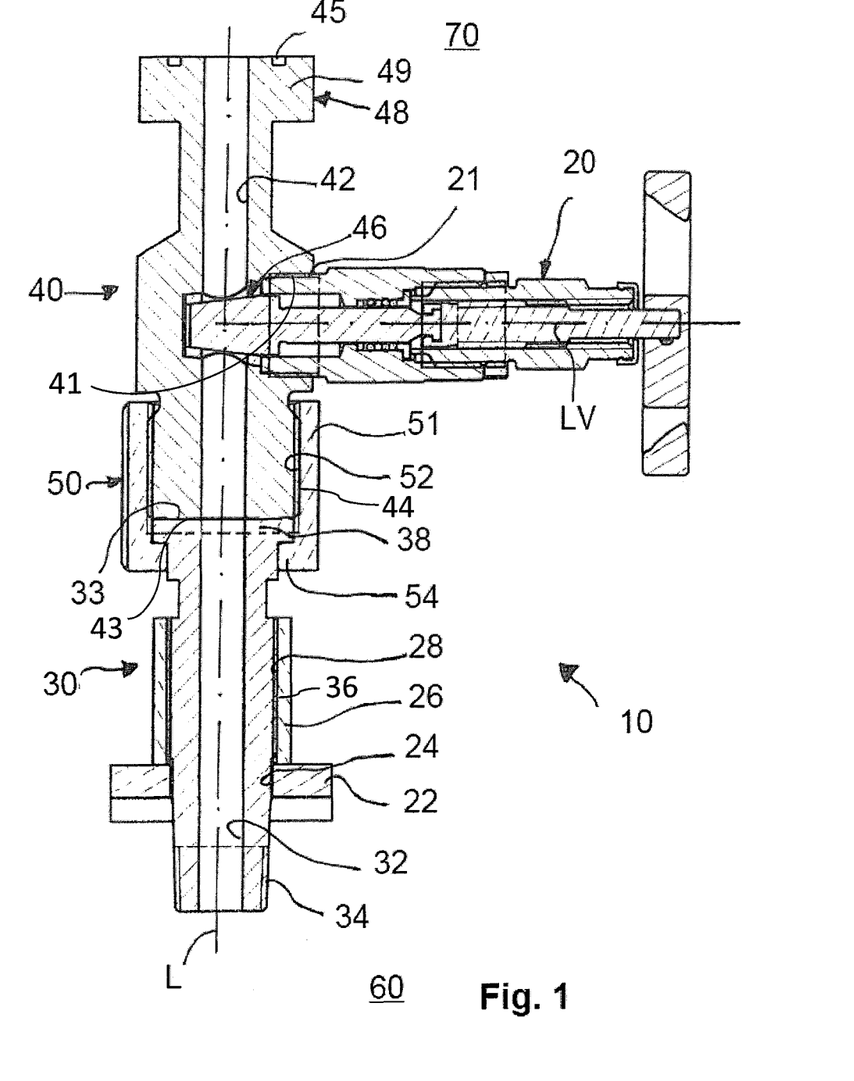
FIG. 1 shows a schematic cross section through a connecting apparatus with a first and second connecting device which can be clamped together with sealing effect via a nut unit, wherein the second connecting device has a shutoff valve.
Figure 3:
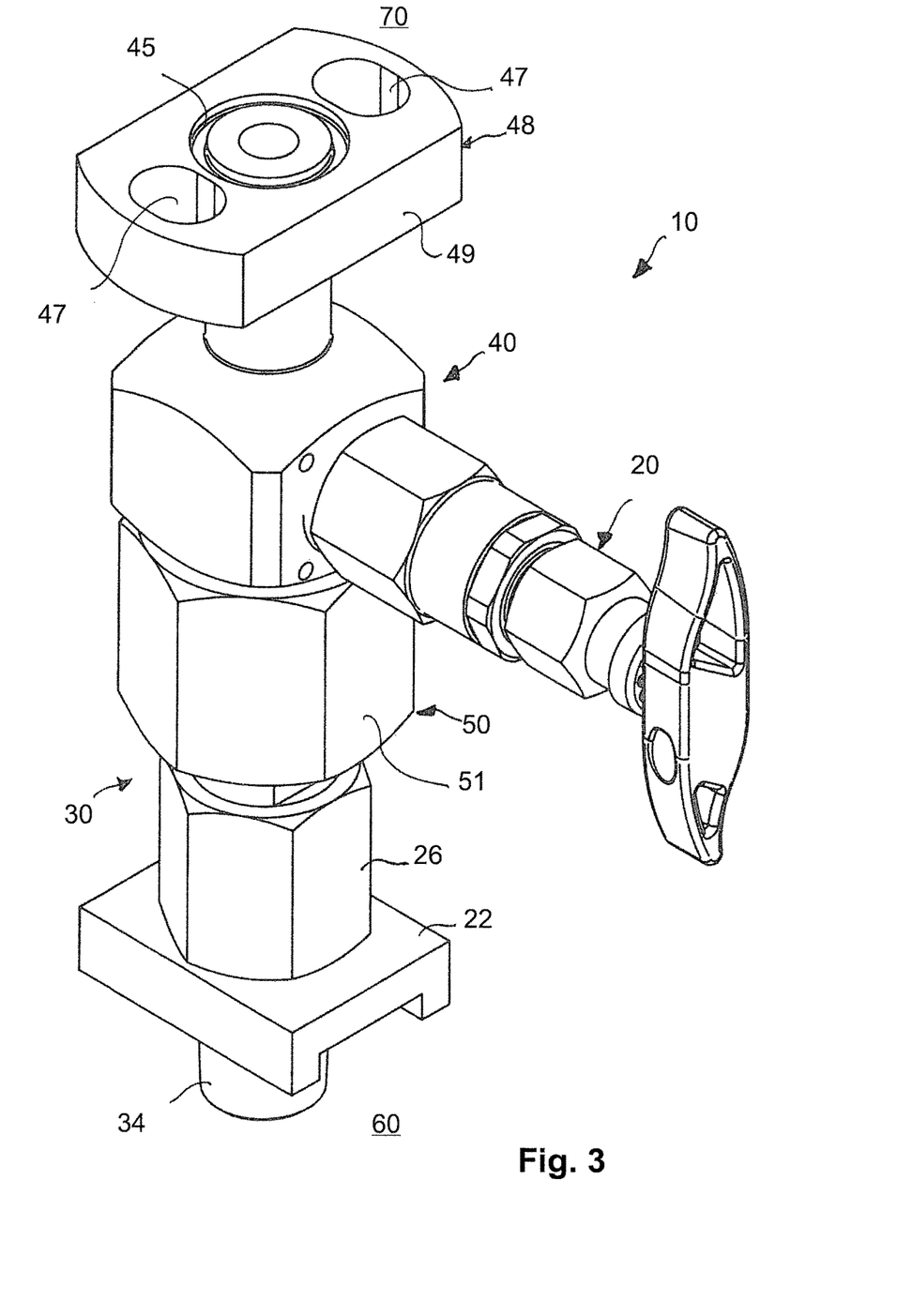
FIG. 3 shows a schematic perspective view of the connecting apparatus according to FIG. 1.
Figure 4:
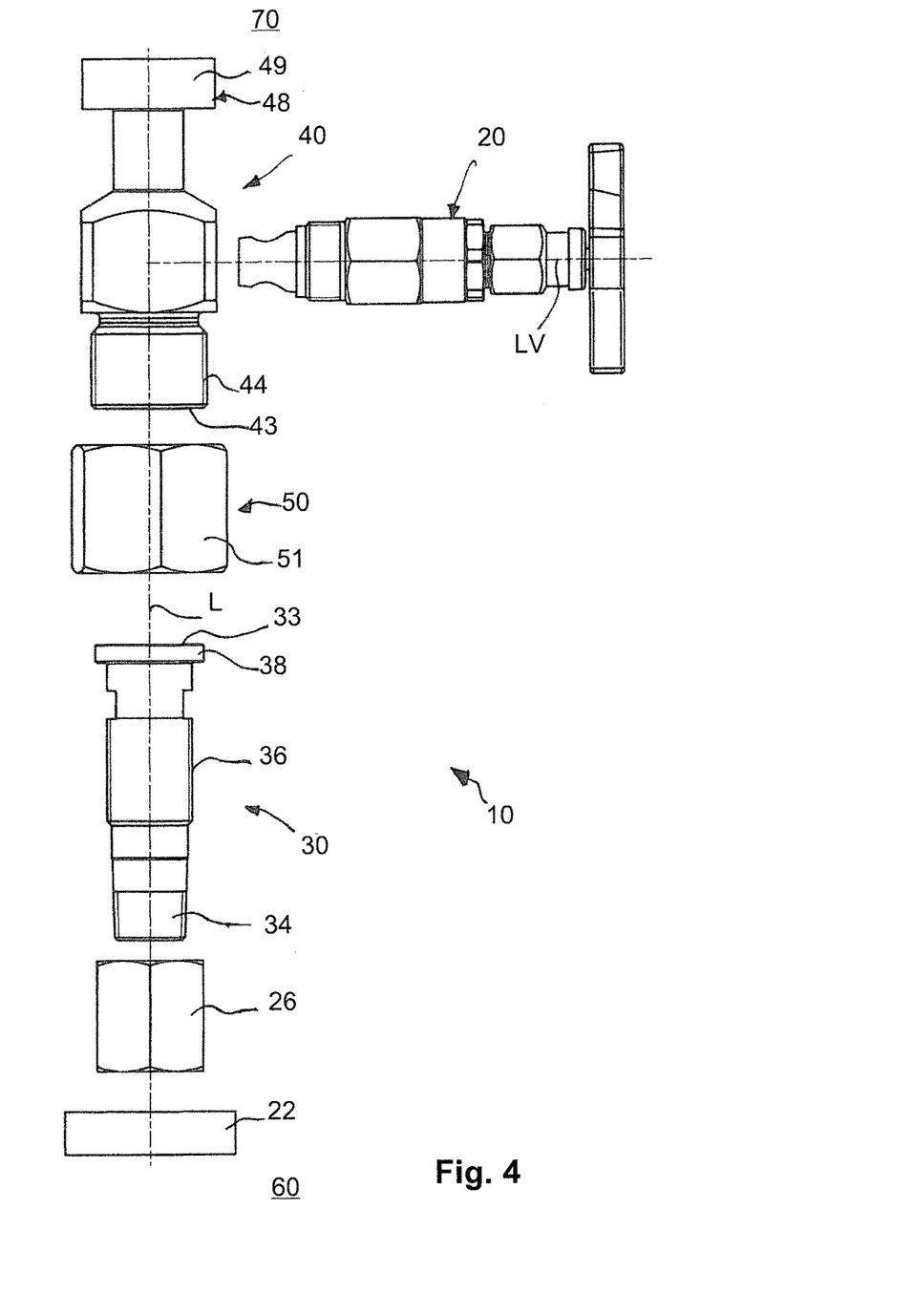
FIG. 4 shows a schematic side view of the connecting apparatus according to FIG. 2 in exploded view.
Figure 5:
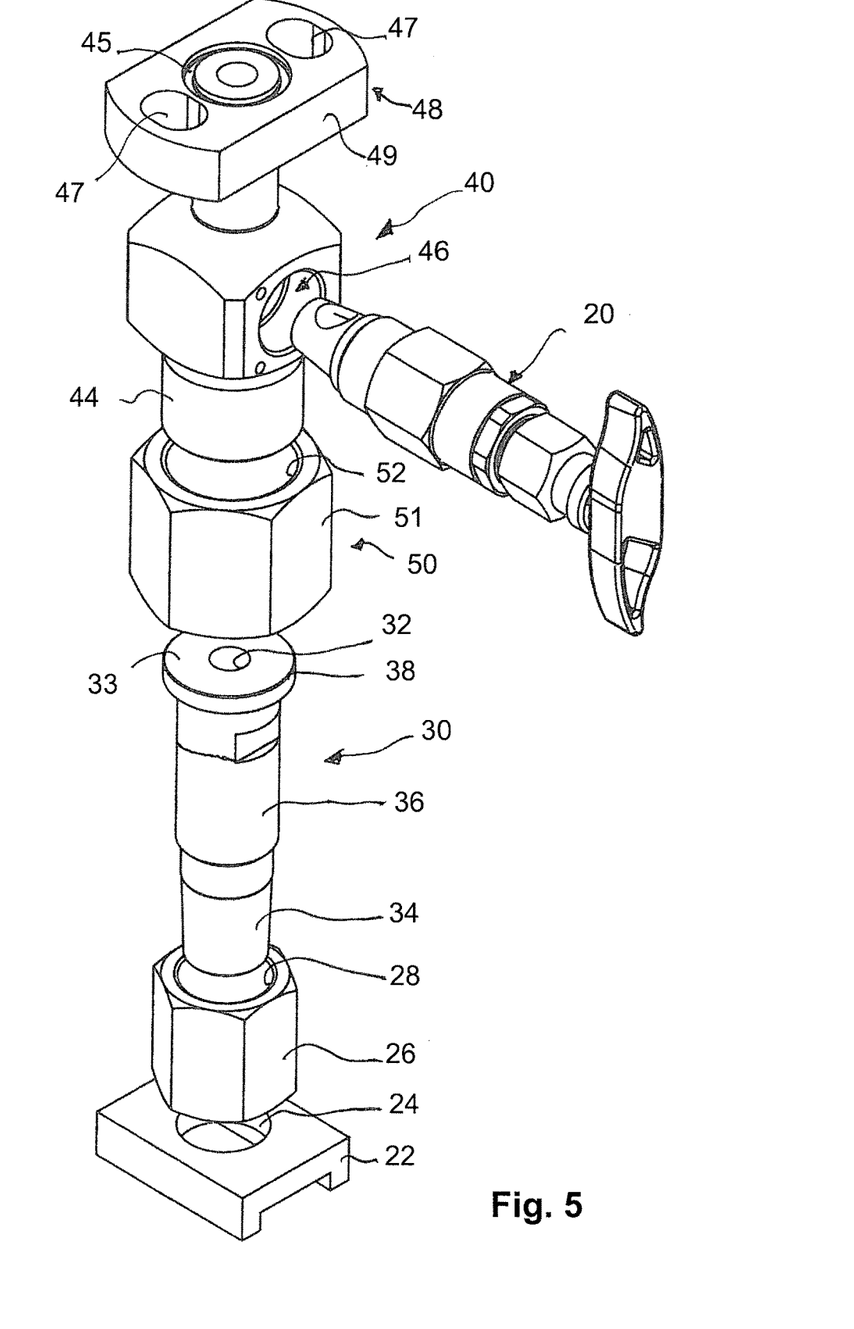
FIG. 5 shows a schematic perspective view of the connecting apparatus according to FIG. 3 in exploded view.

In FIGS. 1 and 3, the connecting apparatus 10 is shown in the assembled state.

The great advantage of the connecting apparatus 10 according to the invention lies in the fact that the connection between first connecting device 30 and second connecting device 40 can be created via the connecting unit 50 without the installed position of the first connecting device 30 or of the second connecting device 40 having to be altered, but by the clamping action with sealing effect being carried out solely by operation, that is to say by rotation, of the connecting unit 50. In this case, the two sealing surfaces 33, 43 are clamped together with sealing effect.

Apart from that, the connecting apparatus 10 according to the invention can be delivered ex-works to the work site in a preassembled state as "one" component, as described below.

First of all, at the factory the shutoff valve 20 is connected to the second connecting device 40 and leak tested.

After this, the first connecting device 30 is introduced from the top into the connecting unit 50, wherein the end position is formed by the abutment of the connecting flange 38 of the first connecting device 30 against the inner flange 54 of the connecting unit 50.

Following this, the clamping nut 26 is screwed from the bottom onto the male thread 36 of the first connecting device 30 and the baseplate 22 is threaded from the bottom via its opening 24 onto the first connecting device 30.

In the factory, the second connecting device 40 can now be loosely screwed from the top via its male thread 44 into the female thread 52 of the connecting unit 50 (nut unit 51).

As a result, the connecting device according to the invention is "ready for dispatch" and can be delivered to the work site. At the work site, the first connecting device 30 is then screwed into the metering orifice device 18 via the conical thread 34 until a reliable sealing function is created. Following this, the baseplate 22 is clamped on the upper-side outer surface of the metering orifice device 18 by rotation of the clamping nut 26 so that a particular rigid fixing of the first connecting device 30 on the metering orifice device 18 is provided. The second connecting device 40 is aligned with regard to the upper-side connection of the valve block 12, which is possible without any problem since the female thread 52 of the connecting unit 50 in conjunction with the male thread 44 of the second connecting device 40 still has not created a clamping connection.

As soon as the alignment or possibly the connection of the second connecting device 40 to the valve block 12 has been carried out, the sealing connection between first connecting device 30 and second connecting device 40 is achieved in a simple manner by the connecting unit 50 (nut unit 51) being made to rotate until the end-face sealing surface 33 of the outer flange 38 of the first connecting device 30 comes to bear with pressure on the end-face sealing surface 43 of the second connecting device 40.

In an embodiment variant, which is not shown, provision is made between the end-face sealing surface 43 and the end-face sealing surface 33 for sealing means which ensure a permanently reliable sealing function.

By means of the connecting apparatus 10 according to the invention, a sealing connection can therefore be created in a simple manner between valve block 12 and metering orifice device 18 without the fitter having to take into account the respective rotational position of the first or second connecting device 30, 40. This is set beforehand and experiences no change during the sealing connection by rotation of the connecting unit 50.

Figure 7:
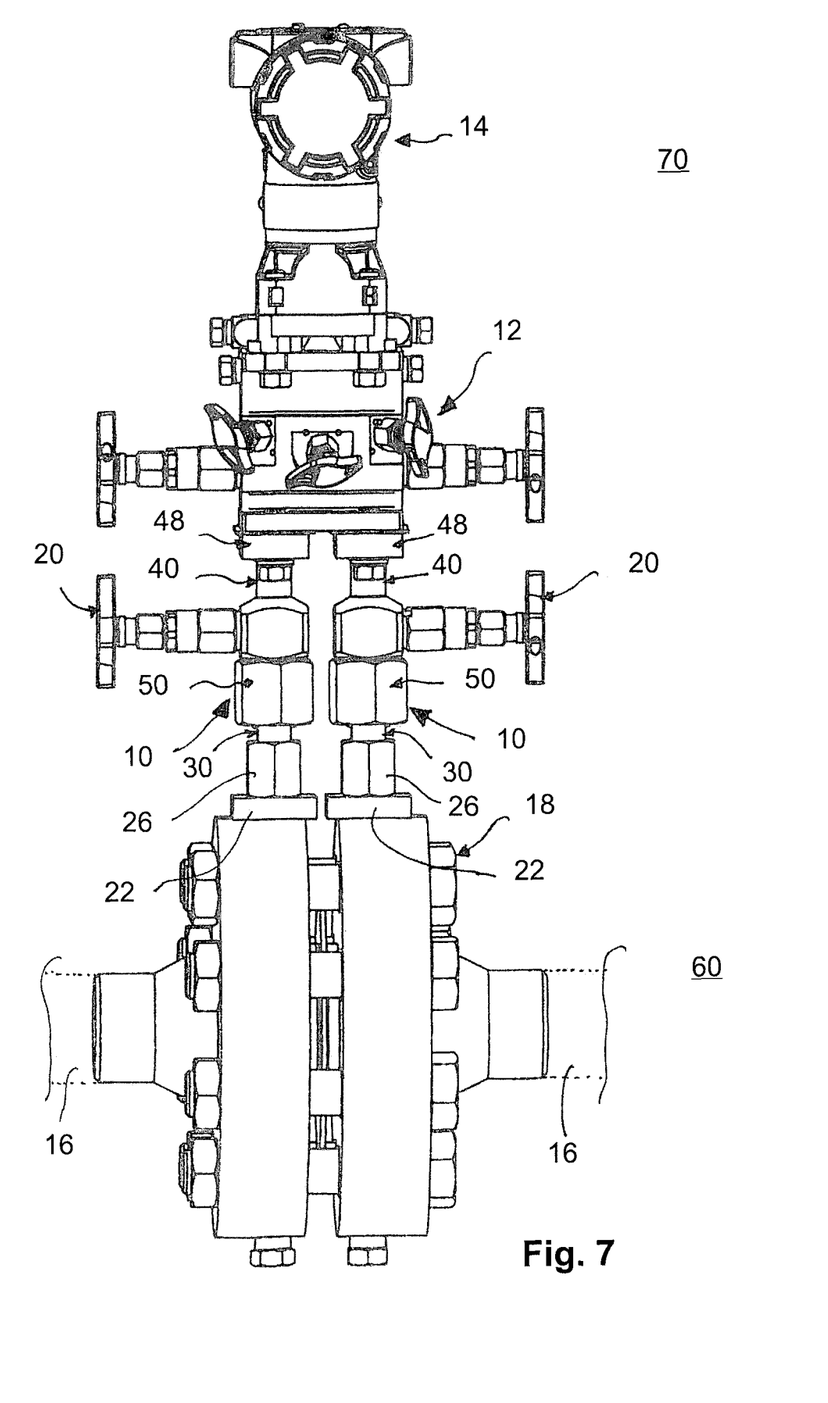
FIG. 7 shows a constructional exemplary embodiment of the use of two connecting apparatuses according to the configuration shown in FIG. 6.

Shown in FIG. 7 is a constructional exemplary embodiment of the use of connecting apparatuses 10 according to the invention, with reference to the greatly schematized view in FIG. 6.

The two connecting apparatuses 10 required for the connection of the measuring instrument 14 can be arranged compactly next to each other, wherein the additional provision of an outwardly projecting shutoff valve 20 on the connecting apparatuses 10 does not present a problem. With the connecting apparatus 10 according to the invention, an exceptionally simple installation is possible, wherein in the installed state a permanently reliable function is ensured.

LIST OF DESIGNATIONS

10 Connecting device
12 Valve block
14 Measuring instrument
16 Pipeline
18 Metering orifice device
19 Orifice unit
20 Shutoff valve
21 Male thread
22 Baseplate
24 Baseplate opening
26 Clamping unit
28 Female thread of 26
30 First connecting device
32 First through-opening of 30
33 End-face sealing surface of 30
34 Conical thread of 30
36 Male thread of 30
38 Connecting flange of 30
40 Second connecting device
41 Female thread
42 Second through-opening of 40
43 End-face sealing surface of 40
44 Male thread of 40
45 Groove
46 Connecting unit of 40 for 20
47 Threaded opening
48 Upper connecting unit of 40
49 Connecting flange
50 Connecting unit
51 Nut unit
52 Female thread of 51
54 Inner flange of 51
60 Lower side
70 Upper side
F Fluid flow direction
L Longitudinal axis of 10
LV Longitudinal axis of 20

The invention claimed is:

1. A connecting apparatus comprising:
a first connecting device that is connectable to a pipeline or to a metering orifice device in a sealing manner, said first connecting device having a first through-opening in a longitudinal direction;
a second connecting device that provides a sealing connection to a measuring instrument or to a valve block/valve, said second connecting device having a second through-opening in a longitudinal direction; and
a connecting unit that provides a sealing connection to the first and second connecting devices, wherein
the first and second connecting devices are interconnected with sealing effect,
the connecting unit is designed so that the sealing connection can be created solely by rotation of the connecting unit without rotating the first and second connecting devices,
an upper edge region of the first connecting device has an outwardly pointing outer flange and an end-face sealing surface,
a lower edge region of the second connecting device has a male thread and an end-face sealing surface, the connecting unit is designed as a nut unit with a female thread and an inwardly pointing inner flange which is arranged in the lower edge region, the outwardly pointing outer flange of the first connecting device fits behind the inner flange of the nut unit, the female thread of the nut unit is screwed onto the male thread of the second connecting device so that by means of the inner flange and the outer flange the end-face sealing surfaces are clamped together with sealing effect, a shutoff valve is connected to the second connecting device, a longitudinal axis of which extends obliquely to a longitudinal axis of the apparatus, the outer flange and the inner flange are provided in an encompassing manner on the first connecting device or on the nut unit, and sealing means are arranged between the end-face sealing surface of the first connecting device and the end-face sealing surface of the second connecting device.

2. The connecting apparatus as claimed in claim 1, wherein
the first connecting device has a thread in a lower edge region of the first connecting device.

3. The connecting apparatus as claimed in claim 2, wherein the thread has a conical shape.

4. The connecting apparatus as claimed in claim 1, wherein
the first connecting device has a male thread upon which can be screwed a clamping nut with female thread, wherein the clamping nut can be clamped on the surface of the first connecting device.

5. The connecting apparatus as claimed in claim 4, further comprising:
a baseplate that has through-openings through which the first connecting device can pass, in certain sections, in the longitudinal direction, said baseplate being clamped by means of the clamping nut on the surface of the pipeline.

6. The connecting apparatus as claimed in claim 1, wherein
the second connecting device has an outwardly pointing outer flange in an upper edge region of the second connecting device that is connectable to a valve block or to a measuring instrument.

7. The connecting apparatus as claimed in claim 1, wherein the longitudinal axis of the shutoff valve extends to the longitudinal axis of the apparatus at an angle of 90°.

* * * * *